(12) United States Patent
Baki

(10) Patent No.: US 7,836,913 B1
(45) Date of Patent: Nov. 23, 2010

(54) UNIVERSAL CARTRIDGE FOR A MIXER FAUCET

(75) Inventor: Gyozo Baki, Budapest (HU)

(73) Assignee: Kerox-Multipolar II. KFT., Diosd (HU)

( * ) Notice: Subject to any disclaimer, the term of this patent is extended or adjusted under 35 U.S.C. 154(b) by 891 days.

(21) Appl. No.: 09/744,035

(22) PCT Filed: Jul. 16, 1999

(86) PCT No.: PCT/HU99/00052

§ 371 (c)(1),
(2), (4) Date: Apr. 20, 2001

(87) PCT Pub. No.: WO00/05524

PCT Pub. Date: Feb. 3, 2000

(30) Foreign Application Priority Data

Jul. 22, 1998 (HU) .................................. 9801648

(51) Int. Cl.
*F16K 11/06* (2006.01)
(52) U.S. Cl. .................................. 137/625.4; 137/269
(58) Field of Classification Search ............ 137/625.17, 137/625.41, 269, 270, 625.4, 271
See application file for complete search history.

(56) References Cited

U.S. PATENT DOCUMENTS

| 4,676,270 A | * | 6/1987 | Knapp et al. | 137/625.4 |
| 4,804,011 A | * | 2/1989 | Knapp | 137/270 |
| 5,329,958 A | * | 7/1994 | Bosio | 137/269 |
| 5,331,997 A | * | 7/1994 | Bosio | 137/270 |
| 5,402,819 A | * | 4/1995 | Bosio | 137/270 |
| 5,806,552 A | * | 9/1998 | Martin, Jr. | 137/270 |
| 5,893,386 A | * | 4/1999 | Caria et al. | 137/271 |
| 6,237,622 B1 | * | 5/2001 | Cook et al. | 137/270 |

FOREIGN PATENT DOCUMENTS

EP 0 684 416 11/1995

* cited by examiner

*Primary Examiner*—John Fox
(74) *Attorney, Agent, or Firm*—Bachman & LaPointe, P.C.

(57) ABSTRACT

Valve battery cartridge—used primarily for mixing cold water and warm water—which has two discs arranged one above the other to form a plane sealing together, being the lower disc a stationary inlet disc (6) and the upper disc a control disc (5) suitable to be displaced and rotated on the inlet disc (6); where said control disc (5) is in mechanical connection with a driving arm (1) pivoted in a lever holder (2)—through a ceramic moving element (4) as the case may be—and the lever holder (2) is arranged in the cartridge casing that allows it to be rotated, while on the base (9) of the cartridge a connection place (14) is formed or arranged for the reception of at least one insertion piece (10), further the opening for the admission of the insertion piece (10) of the connection place (14) is formed principally in a direction which is parallel with the longitudinal axis of the cartridge, whereas the connection place (14) is an outwardly directed sleeve, arranged or formed on the base (9), wherein the cold and warm water inlet formed in the base are ending.

11 Claims, 7 Drawing Sheets

UNIVERSAL CARTRIDGE FOR A MIXER FAUCET

BACKGROUND OF THE INVENTION

In the technical practice, valve battery insertion assemblies called cartridges are already known which implement the tasks of closing and opening the cold- and warm-water inlet pipelines, the mixing of cold- and warm water as well as the routing of the mixed water to the outlet of the valve battery in a single structural assembly, the so-called cartridge.

In their basic design, these cartridges include a cartridge casing bordered with a base, an inlet disc fixed inside the cartridge casing as well as a control disc suitable to be displaced and rotated on the inlet disc on the side opposite to the base.

The control disc is driven through a ceramic moving element by means of a driving arm pivoted in the lever holder.

The level holder supporting the driving arm is arranged in the cartridge casing so as to allow it to be rotated.

In the inlet disc and the control disc, appropriate bores and holes are shaped for the purpose of controlling the inlet of cold- and warm water as well as the outlet of mixed water.

The cartridges of simpler design described above are widely used; in fact, they are capable of fulfilling the basic functions expected of a cartridge used in valve batteries, even without any addition.

There are, however, an increasing demand for cartridges to fulfil other functions as well.

The functions required most frequently are the pressure equalization, the use of non-return valves and the reversibility.

The pressure equalization of both the cold water and warm water is a very important task; otherwise, any sudden change in the pressure of either inlet branch would result in scalding and cold water shock, respectively, to the user.

Pressure reduction of cold water inlet occurs frequently if a cold water consumer device e.g. toilet rinsing tap is mounted near the mixing valve; in fact, its operation results in sudden decrease in the cold water support pressure which, in turn, causes the sudden rise of mixed water temperature from the cartridge without pressure equalization.

The non-return valves are necessary in installations where the possibility exists that water from the branch of higher pressure flows to that of lower pressure when the cartridge is open.

The possibility of reversion is necessary to allow the cartridge to be connected to an unusual cold water and warm water supply arranged e.g. on two sides of a bathroom wall.

According to the present state of technique, various solutions of the above tasks are known.

The U.S. Pat. No. 5,725,010 describes a pressure equalizer and mixing valve battery in which the pressure equalizer assembly is arranged in the valve battery body between the traditional cartridge and the water inlet pipes.

The patent application No. EP 0559998 also describes a cartridge with pressure equalization. Its essence is, that the base of the traditional cartridge is provided with a protrusion which includes a seat arranged perpendicular to the symmetry axis of the cartridge, and a pressure equalizer is arranged perpendicular to the symmetry axis of the cartridge in the said seat.

Usually, the non-return valves are mounted directly on the inlet pipelines themselves; thus, according to the traditional practice, they are not integrated into the cartridge.

For the solution of reversion, the U.S. Pat. No. 4,676,270 is known, where the reversion is performed by a cylinder which is mechanically independent of the cartridge.

The patent application No. EP 0771980 also describes a solution in which the structural elements of various function are fastened by means of connecting elements to the relevant cartridge casing.

The application No. EP 0 684 416 discloses a cartridge, where in the base of the cartridge there are formed two separated and partly widened conducting openings, separately for the cold and warm water, further in the widened part of each opening there is arranged a back-flow preventer valve, both of them can be manufactured integrally.

This solution is excellent, when the two separate inserts do not have to communicate with each other, however cannot be used if the two separate inserts have to communicate with each other, or have to be connected to each other.

An unfavorable feature of the above solutions is that they are task-specific; this means that the base of cartridge shall be designed according to the task.

In order to eliminate the above unfavorable features, the present invention is aimed at establishing a solution which, without any special technical knowledge, can be used universally for providing the cartridges known in themselves with elements of various additional functions.

This invention is aimed at implementing a cartridge which ensures quickly and safely that, by using cartridges known in themselves and elements performing various additional functions, an arrangement integrated simply and quickly can be established.

According to the present invention, the above task is solved by means of an universal mixing valve battery cartridge—used primarily for mixing cold water and warm water—which has two discs arranged one above the other to form a plane sealing together, being the lower disc a stationary inlet disc and the upper disc a control disc suitable to be displaced and rotated on the inlet disc; where said control disc is in mechanical connection with a driving arm pivoted in a lever holder—through a ceramic moving element as the case may be—and the lever holder is arranged in the cartridge casing that allows it to be rotated; while on the base of the cartridge a connection place is formed or arranged for the reception of at least one insertion piece, further the opening for the admission of the insertion piece of the connection place is formed principally in a direction which is parallel with the longitudinal axis of the cartridge, whereas the connection place is an outwardly directed sleeve, arranged or formed on the base, wherein the cold and warm water inlet formed in the base are ending.

In a preferred embodiment of the mixing valve battery cartridge according to the invention, the insertion piece, which is partly arranged in the connection place, is partly arranged between the valve battery casing and the connection place.

BRIEF DESCRIPTION OF THE DRAWINGS

The valve battery cartridge according to the invention is described in detail, based on the exemplary embodiment indicated in the Figures annexed.

DETAILED DESCRIPTION OF PREFERRED EMBODIMENTS

Figure 1:
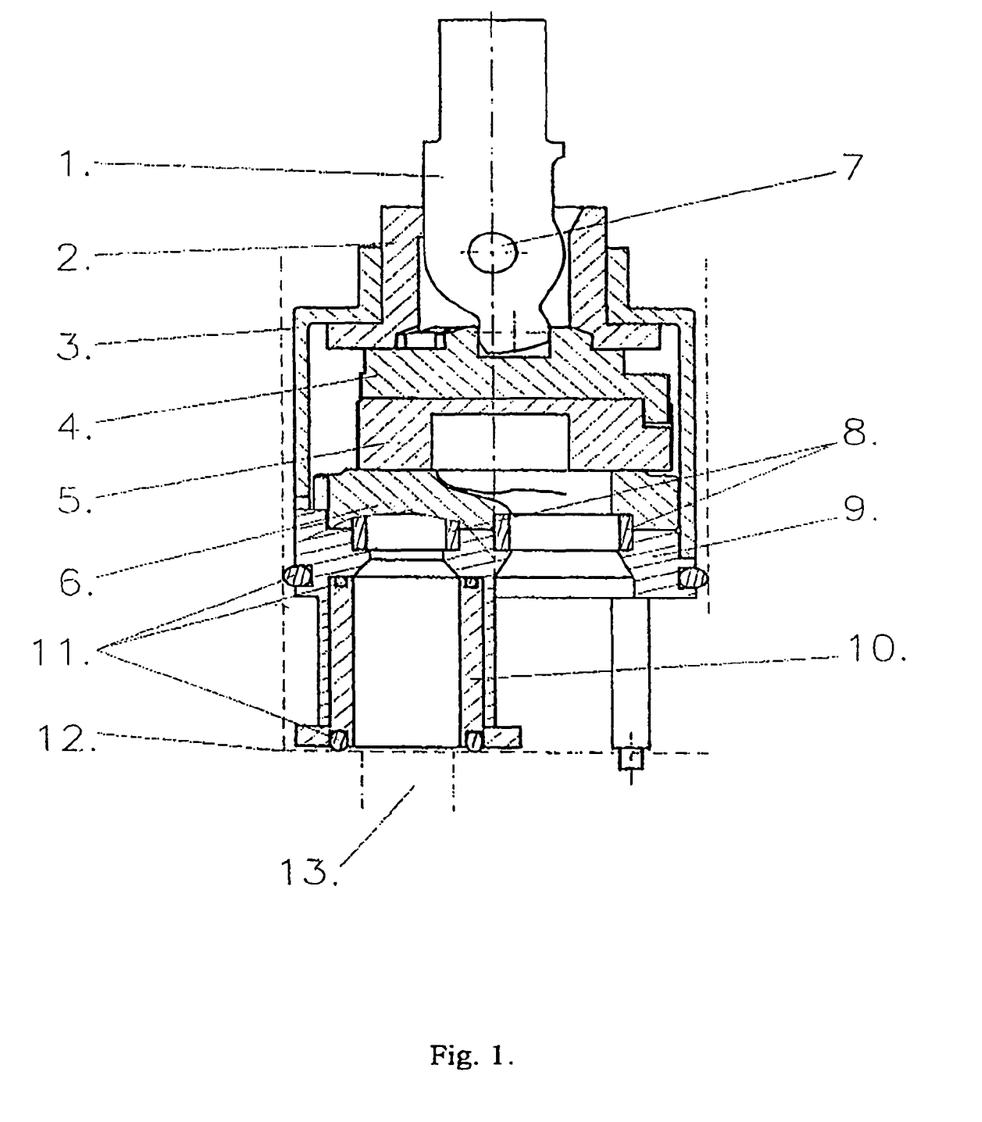
FIG. 1 shows the basic type of the cartridge according to the invention in side sectional view with an insertion piece.

As shown in FIG. 1 that, in the valve battery body 12 of a valve battery, a casing 3 is arranged, which accommodates a lever holder 2 so as to allow its rotation.

The lever holder 2 holds the driving arm 1 pivoted on the rotational axis 7, being said driving arm 1 in connection through the ceramic moving element 4 with the control disc 5.

The control disc 5 is arranged on the inlet disc 6 in which holes are shaped for the inlet of cold water and warm water as well as outlet of mixed water.

The inlet disc 6 is arranged on the base 9 connected to the casing 3, where the base 9 includes the connection place 14 to accommodate the insertion piece 10.

In the holes of the base 9 and the inlet disc 6, the rubber sealing 8 is arranged while between the valve battery body 12 and the casing 3, and the insertion piece 10 and the base 9 as well as the other end of the insertion piece 10 and the valve battery body 12, the seals 11 are arranged. In the valve battery body 12, the connection ducts 13 are shaped.

Figure 2:
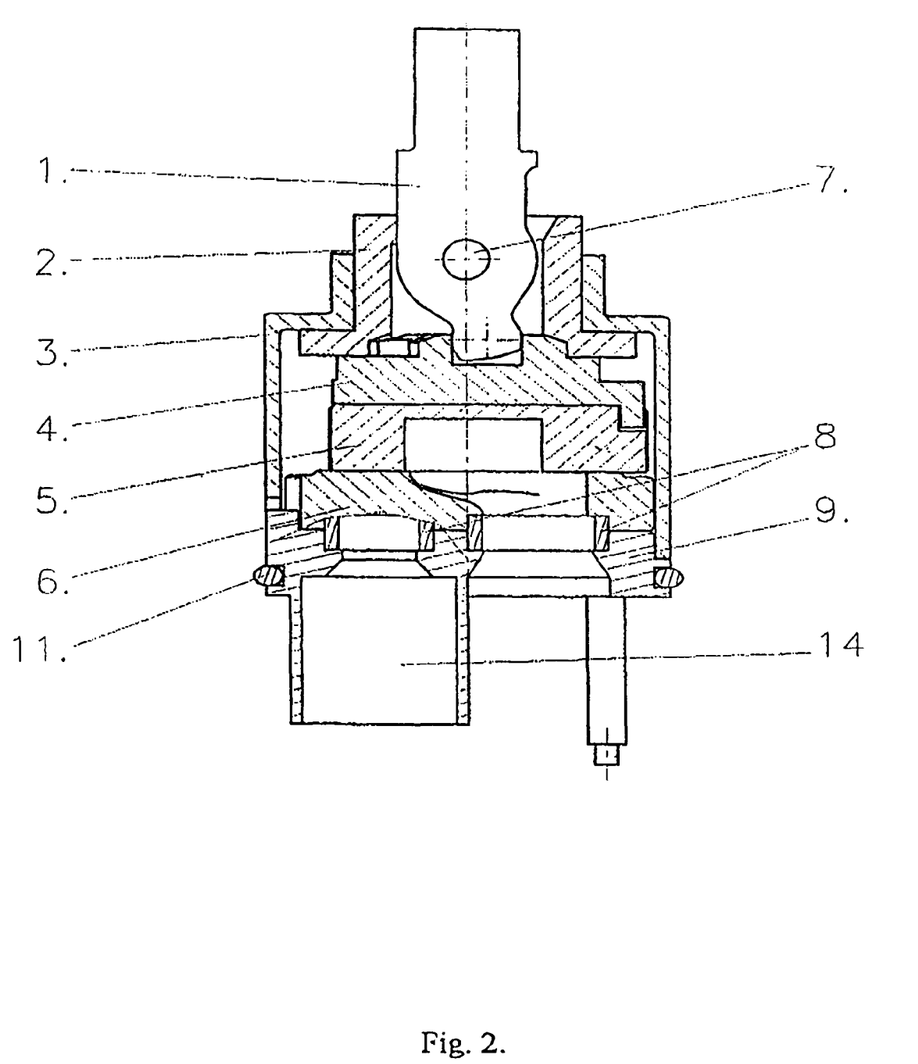
FIG. 2 shows the basic type of the cartridge according to the invention in side sectional view without an insertion piece.

FIG. 2 shows the valve battery cartridge of FIG. 1 without the insertion piece 10.

Figure 3:
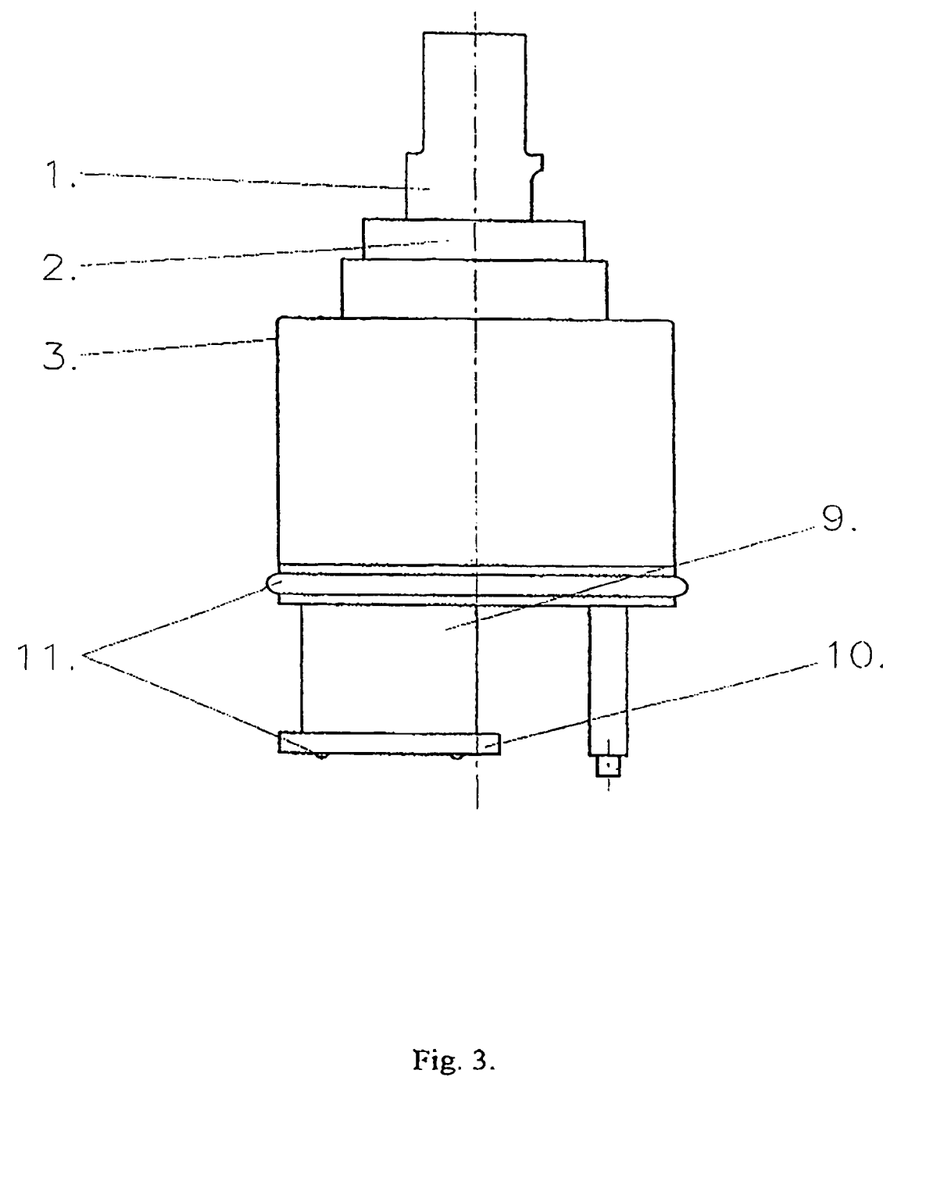
FIG. 3 shows the side view of the basic type of cartridge according to the invention.

FIG. 3 shows the side view of the cartridge of FIG. 1.

Figure 4:
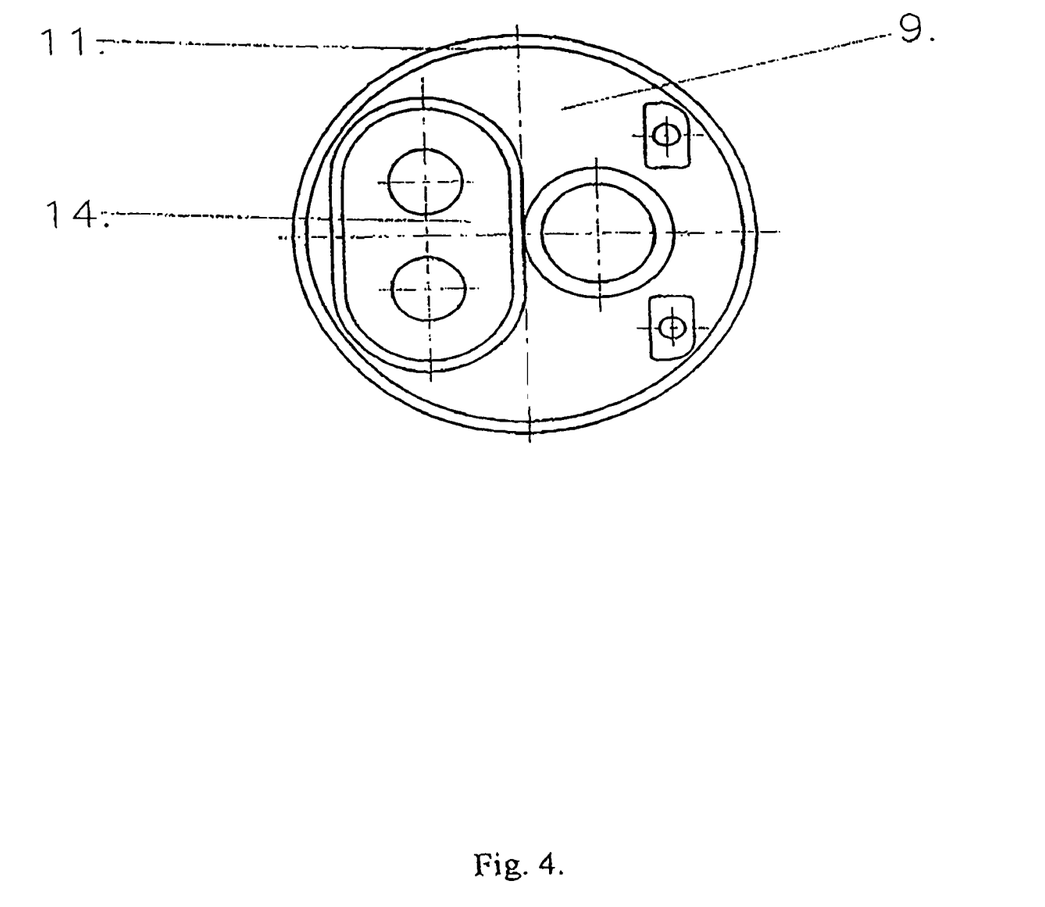
FIG. 4 shows the bottom view of the basic type of cartridge according to the invention.

FIG. 4 shows the bottom view of the base 9.

Figure 6:
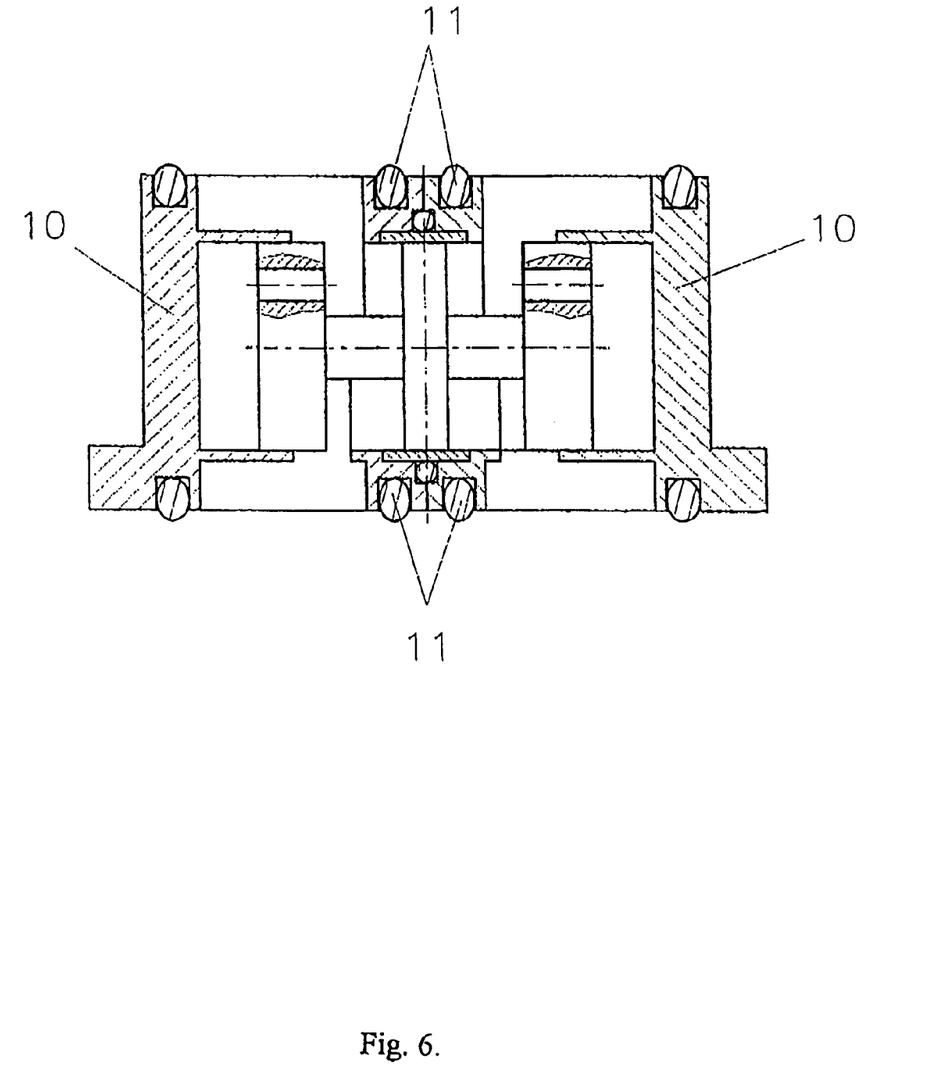
FIG. 6 shows the design of the pressure equalizer insertion for the cartridge according to the invention.
Figure 7:
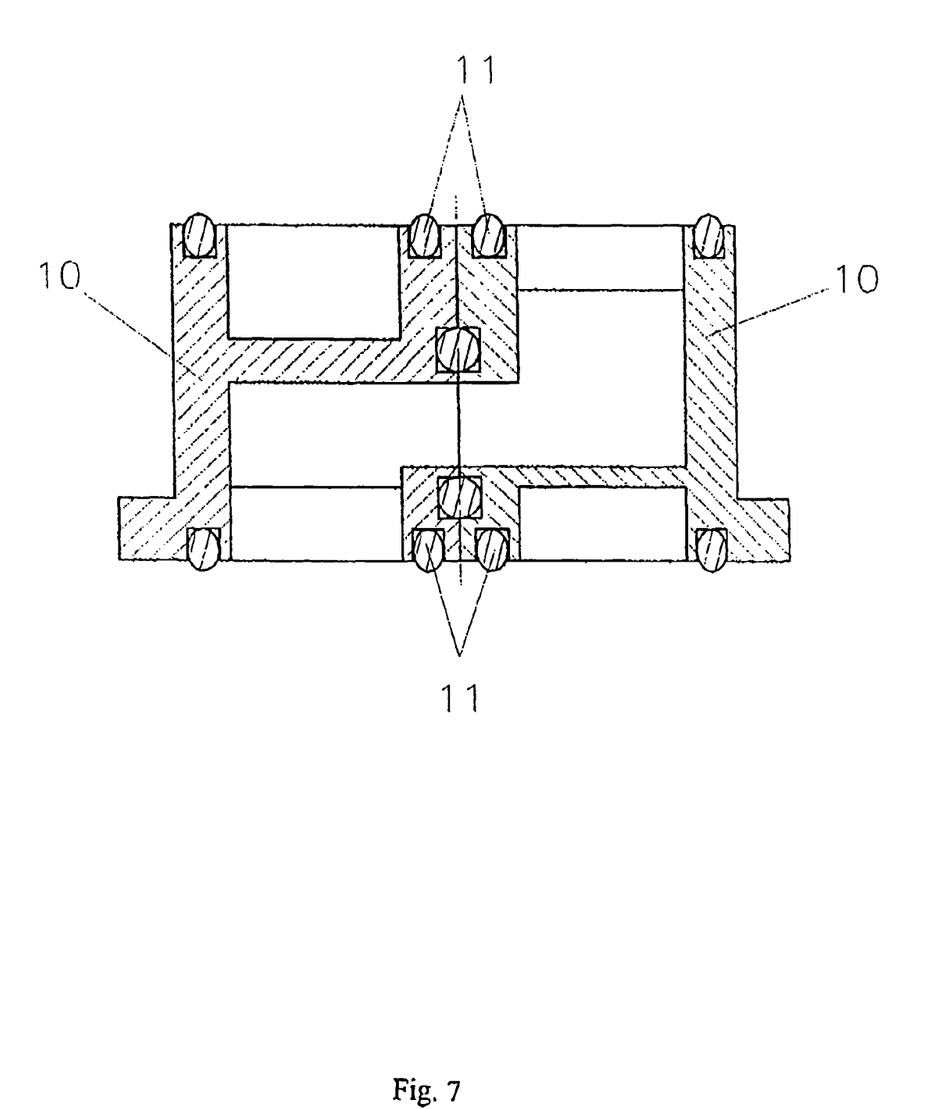
FIG. 7 shows the design of the reverting insertion piece for the cartridge according to the invention.

The insertion piece 10 shown in FIG. 1 is suitable to be used for straight passage. The insertion piece 10 shown in FIG. 6 is designed as a pressure equalizer insertion piece. The insertion piece 10 shown in FIG. 7 is designed as a reverting insertion piece.

The function of the cartridge according to the invention is described below in detail.

As shown in FIG. 1, by actuating the driving arm 1, the relative position of the control disc 5 and the inlet disc 6 can be changed through the ceramic moving element 4.

By shutting off and bypassing the holes in the inlet disc 6 by means of the control disc 5, the temperature and flow of water outlet via the opening shaped in the base 9 to the valve battery body 12 can be changed in a manner known in itself.

The insertion piece 10 arranged in the connection place 14 parallel to the axis of the cartridge ensures the connection between the connection ducts 13 shaped in the valve battery body 12 and the inlet holes of base 9, while the seals 11 arranged between the valve battery body 12 and the insertion piece 10 ensure the leakage-free isolation between these connecting ducts and the inner space of valve battery body 12.

Thus, in the casing 3 of cartridge known in itself, the cold water and warm water flows from the connecting ducts 13 of the valve battery body 12 through the current insertion piece 10 to the holes shaped in the base 9 of the cartridge and, then, to the bores and holes of the inlet disc 6.

Figure 5:
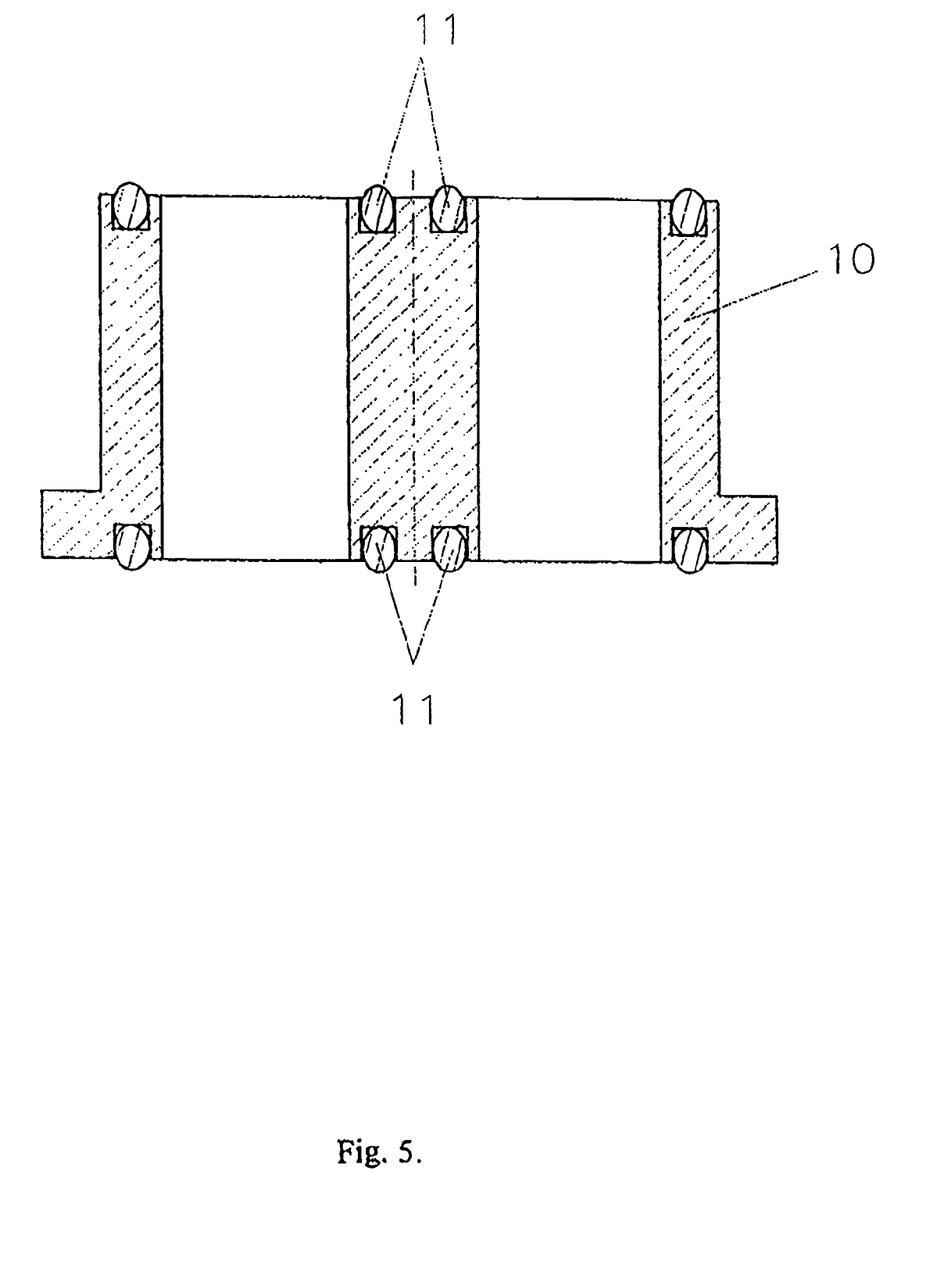
FIG. 5 shows the design of the standard insertion piece for the cartridge according to the invention.

By changing the insertion piece 10, the cartridge provided with the insertion piece 10 is capable of fulfilling various functions; thus, the insertion piece 10 shown in FIG. 5 implements a simple inlet, the insertion piece 10 shown in FIG. 6 implements pressure equalization while the insertion piece 10 shown in FIG. 7 implements the inversion of water inlet.

The insertion pieces 10 are always inserted parallel to the longitudinal axis of cartridge into the connection place 14; thus, the seals 11 are under pressure when the cartridge is mounted in the valve battery body 12 and ensure sufficient sealing.

The advantage of the cartridge according to the invention is that, by changing the insertion piece 10 that requires no special skill, the function of the cartridge can be arbitrarily specified and changed by using the insertion pieces 10 available.

The invention claimed is:

1. Valve battery cartridge used for mixing cold water and warm water, comprises two discs (5,6) arranged one above the other to form a plane sealing together, wherein the lower disc (6) is a stationary inlet disc and the upper disc (5) is a control disc which is displaceable and rotatable on the inlet disc; where the control disc (5) is in mechanical connection with a driving arm (1) pivoted in a lever holder (2) through a ceramic moving element (4), the lever holder (2) is rotatably arranged in a cartridge casing (3), the base (9) of the cartridge casing (3) is formed with a connection element (14) for receiving an interchangeable insertion piece (10) selected from at least three different insertion pieces, wherein an opening for receiving any of the interchangeable insertion pieces in the connection element is formed in a direction which is substantially parallel with a longitudinal axis of the cartridge, wherein the connection element (14) in the base (9) of the cartridge casing (3) receives any of the interchangeable insertion piece (10) which enables connection between connection ducts (13) in a valve battery body (12) and inlet openings, and wherein a longitudinal axis of the interchangeable insertion pieces is substantially parallel to the longitudinal axis of the cartridge in the base (9) and the base (9) is provided with seal means (11) insulating the connection element from an inner space of the valve battery body (12).

2. Battery cartridge for use in a battery body (12) for mixing cold and warm water comprising two discs (5,6) arranged one above the other and together forming a planar seal, comprising a fixed inlet disc (6) and a control disc (5) which is displaceable and rotatable on the inlet disc (6), the control disc (5) comprising a movement lever (1) rotatably mounted in a lever holder (2) and being mechanically connected via a ceramic drive (4), the lever holder (2) being rotatably arranged in a cartridge housing (3) at a lower part (9) of the cartridge housing (3) at a side opposing the inlet disc (6) and facing the battery body (12), a connecting element (14), of which inlet apertures substantially extend in a longitudinal direction of the cartridge housing (3), and a replaceable insert (10) selected from at least three different replaceable inserts being arranged in a sealed manner in the connecting element (14) between connecting passages (13) constructed in the battery body (12) and the inlet apertures of the lower part (9), wherein the connecting element (14) encompasses the inlet apertures provided in the lower part (9) of the cartridge housing (3), and the inlet apertures are sealed from one another by any of the replaceable inserts.

3. Battery cartridge according to claim 2, wherein seals (11) are arranged between the insert (10) and the lower part (9) and between one end of any of the inserts (10) and the battery body (12) for sealing the insert with the connection element.

4. Battery cartridge according to claim 2, wherein seals (11) are arranged to seal between any of the three inserts (10) and the lower part (9) and between one end of any of the three inserts (10) and the battery body (12).

5. Battery cartridge according to claim 2, wherein each of the three replaceable inserts provide a different function.

6. Battery cartridge according to claim 5, wherein one of the replaceable inserts is a pressure equalizer insert and another of the replaceable inserts is a reverting insertion piece.

7. Valve battery cartridge used for mixing cold water and warm water, comprises two discs (5,6) arranged one above the other to form a plane sealing together, wherein the lower disc (6) is a stationary inlet disc and the upper disc (5) is a control disc which is displaceable and rotatable on the inlet disc; where the control disc (5) is in mechanical connection with a driving arm (1) pivoted in a lever holder (2) through a ceramic moving element (4), the lever holder (2) is rotatably arranged in a cartridge casing (3), the base (9) of the cartridge casing (3) is formed with a connection element (14) for selectively receiving different interchangeable insertion pieces (10) selected from at least three insertion pieces, wherein an opening for receiving any of the interchangeable insertion pieces in the connection element is formed in a direction which is substantially parallel with a longitudinal axis of the cartridge, wherein the connection element (14) in the base (9) of the cartridge casing (3) receives any of the selected interchangeable insertion pieces (10) which enables connection between connection ducts (13) in a valve battery body (12) and inlet openings, and wherein a longitudinal axis of all of the interchangeable insertion pieces is substantially parallel to the longitudinal axis of the selected cartridge in the base (9) and the base (9) is provided with seal means (11) insulating the connection element from an inner space of the valve battery body (12).

8. Valve battery cartridge according to claim 7, wherein each of the three interchangeable insertion pieces provide a different function.

9. Valve battery cartridge according to claim 8, wherein one of the three interchangeable insertion pieces is a pressure equalizer insertion piece and another of the three insertion pieces is a reverting insertion piece.

10. Battery cartridge for use in a battery body (12) for mixing cold and warm water comprising two discs (5,6) arranged one above the other and together forming a planar seal, comprising a fixed inlet disc (6) and a control disc (5) which is displaceable and rotatable on the inlet disc (6), the control disc (5) comprising a movement lever (1) rotatably mounted in a lever holder (2) and being mechanically connected via a ceramic drive (4), the lever holder (2) being rotatably arranged in a cartridge housing (3) at a lower part (9) of the cartridge housing (3) at a side opposing the inlet disc (6) and facing the battery body (12), a connecting element (14), of which inlet apertures substantially extend in a longitudinal direction of the cartridge housing (3), and a selected replaceable insert (10) being arranged in a sealed manner in the connecting element (14) between connecting passages (13) constructed in the battery body (12) and the inlet apertures of the lower part (9), wherein the selected replaceable insert comprises an insert selected from at least three inserts of different functions which are interchangeable with the connecting element to provide different functions for the battery cartridge wherein the connecting element (14) encompasses the inlet apertures provided in the lower part (9) of the cartridge housing (3), and the inlet apertures are sealed from one another by any of the three replaceable inserts.

11. Battery cartridge according to claim 10, wherein the at least three inserts of different function include a pressure equalizer insert and a reverting insert.

* * * * *